US009552735B2

(12) United States Patent
Pilutti et al.

(10) Patent No.: US 9,552,735 B2
(45) Date of Patent: Jan. 24, 2017

(54) AUTONOMOUS VEHICLE IDENTIFICATION

(71) Applicant: Ford Global Technologies, LLC, Dearborn, MI (US)

(72) Inventors: Thomas Edward Pilutti, Ann Arbor, MI (US); Matt Y. Rupp, Canton, MI (US); Roger Arnold Trombley, Ann Arbor, MI (US); Andrew Waldis, Orion Township, MI (US); Wilford Trent Yopp, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 65 days.

(21) Appl. No.: 14/088,232

(22) Filed: Nov. 22, 2013

(65) Prior Publication Data

US 2015/0149019 A1 May 28, 2015

(51) Int. Cl.
G08G 1/00 (2006.01)
B60Q 1/50 (2006.01)
G08G 1/0967 (2006.01)

(52) U.S. Cl.
CPC ........ *G08G 1/22* (2013.01); *B60Q 1/50* (2013.01); *G08G 1/096725* (2013.01); *G08G 1/096741* (2013.01); *G08G 1/096775* (2013.01); *G08G 1/096791* (2013.01)

(58) Field of Classification Search
CPC ...... B60Q 1/26; B60Q 1/50–1/54; G08G 1/20; G08G 1/22
See application file for complete search history.

(56) References Cited

U.S. PATENT DOCUMENTS

| 6,335,681 | B1 * | 1/2002 | Ontiveros et al. ........... 340/466 |
| 6,397,149 | B1 * | 5/2002 | Hashimoto .................. 701/300 |
| 7,472,018 | B2 | 12/2008 | Michi et al. |
| 8,060,307 | B2 | 11/2011 | Matsuno |
| 8,346,480 | B2 | 1/2013 | Trepagnier et al. |
| 8,352,112 | B2 | 1/2013 | Mudalige |
| 8,457,827 | B1 | 6/2013 | Ferguson et al. |
| 8,838,321 | B1 * | 9/2014 | Ferguson ....................... 701/23 |
| 2010/0256836 | A1 * | 10/2010 | Mudalige ......................... 701/2 |
| 2011/0184605 | A1 | 7/2011 | Neff |
| 2011/0307156 | A1 * | 12/2011 | Van Neste ..................... 701/96 |
| 2012/0083960 | A1 | 4/2012 | Zhu et al. |
| 2012/0203436 | A1 * | 8/2012 | Braennstroem .......... B60T 7/22 701/70 |

(Continued)

OTHER PUBLICATIONS

Van Arem, Bart, Van Driel, Cornelie J.G., and Visser, Ruben, "The Impact of Cooperative Adaptive Cruise Control of Traffic-Flow Characteristics", Dec. 2006, IEEE Transactions on Intelligent Transportation Systems, vol. 7, No. 4, pp. 429-436.*

(Continued)

*Primary Examiner* — Jelani Smith
(74) *Attorney, Agent, or Firm* — Frank A. MacKenzie; Bejin Bieneman PLC

(57) ABSTRACT

A computer in a first vehicle is configured to receive data relating to a second vehicle. The computer may use the data to determine that the second vehicle is being operated at least partially autonomously. Further, the computer may cause the first vehicle to take an action to autonomously operate the first vehicle based at least in part on determining that the second vehicle is being operated at least partially autonomously.

20 Claims, 2 Drawing Sheets

(56) References Cited

U.S. PATENT DOCUMENTS

2012/0306634 A1* 12/2012 Tsuda .................. B60Q 1/2611
340/425.5
2015/0025708 A1* 1/2015 Anderson ......................... 701/2

OTHER PUBLICATIONS

Baber, Jonathon, Kolodko, Julian, et al., "Cooperative Autonomous Driving: Intellignet Vehicles Sharing City Roads", Mar. 2005, IEEE Robotics and Automation Magazine, pp. 44-49.*

Schoner et al., "A dynamical systems approach to task-level system integration used to plan and control autonomous vehicle motion", Robotics and Autonomous Systems, vol. 10, Issue 4, 1992.

Petrovskaya et al., "Model based vehicle detection and tracking for autonomous urban driving", Autonomous Robots, Apr. 2009, vol. 26, Issue 2-3, 4 pages.

Martin, "Self-Driving Cars", 6 pages.

* cited by examiner

AUTONOMOUS VEHICLE IDENTIFICATION

BACKGROUND

An autonomous vehicle, e.g., an automobile, bus, truck, watercraft, etc., may include a computing device executing instructions for operating the vehicle either wholly or partially autonomously, i.e., without input from a human operator. For example, the vehicle computing device may receive data from one or more sensors, and then process sensor data to provide input to the computing device for determining autonomous operations of the vehicle. Vehicle sensor data may provide a variety of information concerning a road, road conditions, weather conditions, potential obstacles, other vehicles, etc. However, vehicle sensor data does not provide all of the data that may be useful to an autonomous vehicle computing device for autonomously operating the vehicle. For example, vehicle sensor data cannot always be relied upon to provide useful or even vital information about other vehicles, e.g., whether other vehicles are autonomous.

DRAWINGS

DESCRIPTION

Introduction

Figure 1:
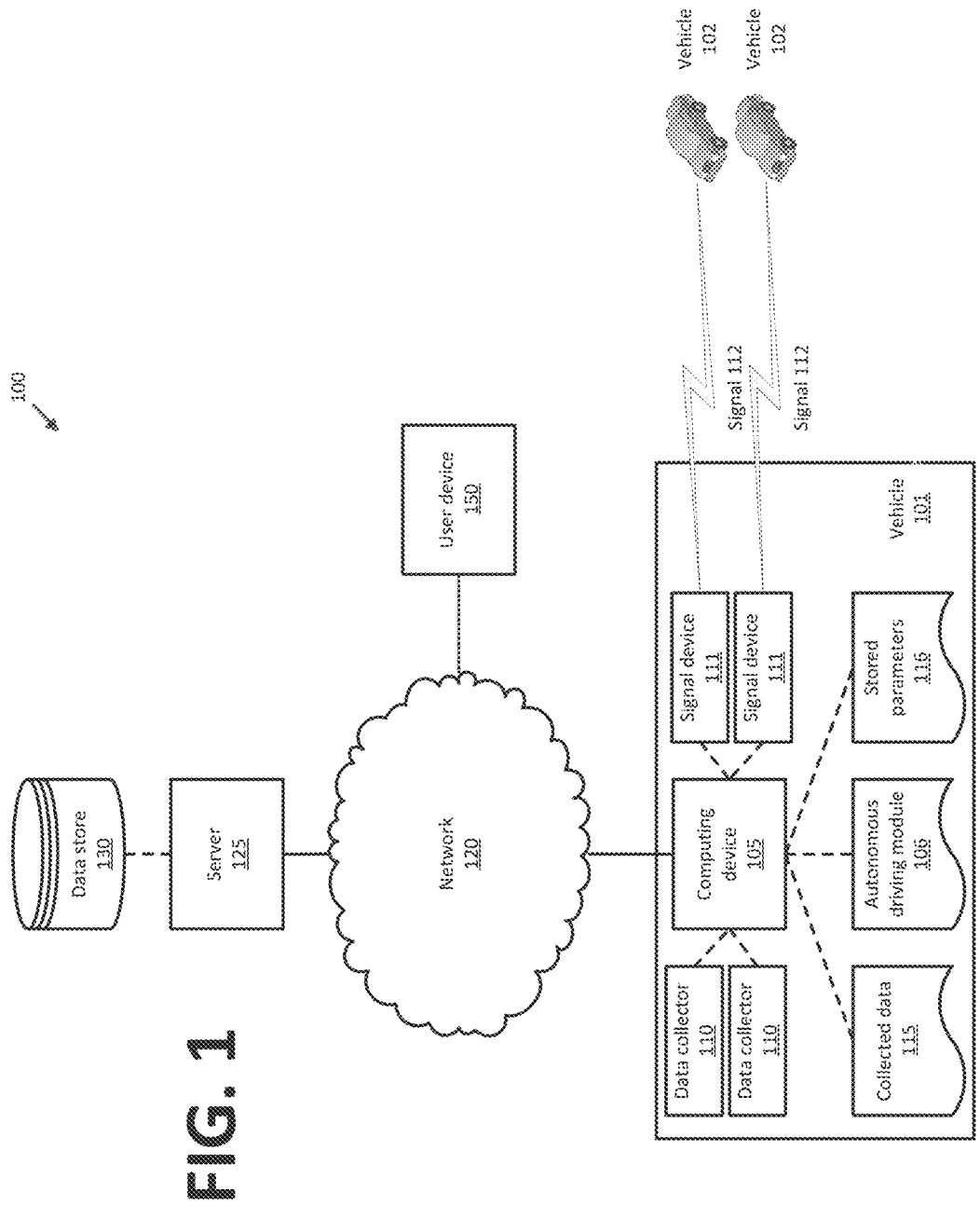
FIG. 1 is a block diagram of an exemplary vehicle system for operating one or more autonomous vehicles.

FIG. 1 is a block diagram of an exemplary vehicle system for operating one or more autonomous vehicles 101. A computing device 105 in the vehicle 101 generally receives collected data 115 from one or more data collectors, e.g., sensors, 110. The computing device 105 may further be configured to cause one or more signal devices 111 to provide, e.g., to one or more other vehicles 102, signals 112 indicating that the vehicle 101 is being autonomously operated. Moreover, data collectors 110 in a vehicle 101 may receive such signals 112 from other vehicles 102. The signals 112 and/or collected data 115 may be used for providing a determination concerning whether one or more second vehicles 101 are being operated autonomously or partially autonomously. An autonomous driving module 106 may perform certain vehicle 101 operations, based on whether one or more second vehicles 102 have been determined to be autonomous or partially autonomous.

The autonomous driving module 106 may be included in the vehicle 101, e.g., as a set of instructions stored in a memory of, and executable by a processor of, the computing device 105. The module 106 is generally configured to evaluate and synchronize collected data 115, including possibly signals from devices 111 from other vehicles 102, and/or one or more stored parameters 116 to autonomously operate the vehicle 101. The module 106 may also evaluate collected data 115 to identify other vehicles 102 as autonomous, e.g., autonomous operation of a vehicle 102 may be determined according to various patterns relating to collected data 115, e.g., data relating to speed, acceleration, braking, turning, steering, etc., of the vehicle 101.

Further, the vehicle 101 may communicate with a central controller, e.g., a server 125 including a data store 130, via a network 120. For example, when operating in an autonomous mode, the vehicle 101 may send a message so indicating to the server 125. Additionally or alternatively, the vehicle 101 may send data to the server 125 concerning other vehicles 102 from which one or more signals 112 have been received. Moreover, the server 125 may provide to one or more vehicles 101 information concerning autonomous vehicles 101 within a given geographic area, within a predetermined distance of the vehicle 101, etc.

Accordingly, a computer 105 in an autonomous vehicle 101 may determine that one or more other autonomous vehicles 102 are proximate, e.g., within a predetermined distance of the vehicle 101. Further, the module 106 may make decisions concerning autonomous operation of the vehicle 101 based on a determination that one or more other autonomous vehicles 102 are proximate and/or signals 112 and/or data 115 concerning such other autonomous vehicles 102. For example, the module 106 may identify another autonomous vehicle 102 with which the vehicle 101 may "convoy," i.e., follow closely behind so as to achieve a drafting effect. For another example, the module 106 may determine that a second vehicle 102 is not autonomously operated, and may implement rules for maintaining a safe distance from a non-autonomous vehicle 102.

Exemplary System Elements

The system 100 includes at least one vehicle 101, and typically but not necessarily also includes one or more other vehicles 102. For ease of description, certain elements are described herein with respect to the vehicle 101, and certain steps, processes, etc., are described from the perspective of the vehicle 101, but it is to be understood that such elements, steps, processes, etc. may also, and likely will, be present in other vehicles 102 in the system 100. Put another way, from the perspective of a vehicle 102, elements and operation ascribed herein to the vehicle 101 may be provided, and moreover, the vehicle 101, from the perspective of such vehicle 102, may itself appear and be treated as a vehicle 102.

A vehicle 101 includes a vehicle computer 105 that generally includes a processor and a memory, the memory including one or more forms of computer-readable media, and storing instructions executable by the processor for performing various operations, including as disclosed herein. For example, the computer 105 generally includes, and is capable of executing, instructions to select and carry out an autonomous operation mode, of the vehicle 101, e.g., as described herein with respect to the module 106.

Further, the computer 105 may include more than one computing device, e.g., controllers or the like included in the vehicle 101 for monitoring and/or controlling various vehicle components, e.g., an engine control unit (ECU), transmission control unit (TCU), etc. The computer 105 is generally configured for communications on a controller area network (CAN) bus or the like. The computer 105 may also have a connection to an onboard diagnostics connector (OBD-II). Via the CAN bus, OBD-II, and/or other wired or wireless mechanisms, the computer 105 may transmit messages to various devices in a vehicle and/or receive messages from the various devices, e.g., controllers, actuators, sensors, etc., including data collectors 110. Alternatively or additionally, in cases where the computer 105 actually comprises multiple devices, the CAN bus or the like may be used for communications between devices represented as the computer 105 in this disclosure.

Signal devices 111 may include a variety of mechanisms. For example, signal devices 111 could include devices emitting visible light located at one or more locations on the exterior of a vehicle 101. Accordingly, a signal 112 could include an emission of visible light, where the light could be displayed to convey information concerning an autonomous vehicle 101, e.g., using one or more colors, e.g., red, blue, and/or yellow, etc., using pulses according to one or more predetermined patterns, etc. For example a first color or pattern could indicate that the vehicle 101 was being operated in a fully autonomous mode, and/or a second color or pattern could indicate that the vehicle 101 was being operated in a partially autonomous mode, and/or a third color or pattern could indicate that the vehicle 101 was being operated manually.

Other examples of signal devices 111 that could be used in addition, or as an alternative, to visible lights include devices 111 emitting radio waves, devices 111 emitting sounds, transmission of one or more data packets according to a communications protocol such as is known, etc. In some implementations, signal devices 111 may be placed so as to be visible to data collectors 110, but so as to not be visible to, or at least not distract, human drivers. For example, a light signal device 111 could be placed below an anticipated sight line of drivers and/or occupants of other vehicles 102. In other implementations, a single device 111 could be placed so as to be visible to drivers, other road users such as pedestrians, and/or occupants of other vehicles 102, e.g., a blue light in a particular location on a vehicle 101 could indicate that the vehicle 101 was being operated fully and/or partially autonomously.

For example, one or more signals 112 could be provided when the vehicle 101 is in an autonomous mode. Signals 112 could indicate that the vehicle 101 is in an autonomous mode, and could further specify a particular autonomous mode of the vehicle 101 where more than one autonomous mode is possible, e.g., implementations of the system 100 are possible in which a vehicle 101 could be in a full autonomous mode, i.e., where all vehicle 101 driving operations are executed by the module 106, or could be in a partial or "restricted" autonomous mode where a subset, but not all, of the vehicle 101 driving operations are executed by the module 106. Different autonomous modes possible for the vehicle 101 could be represented by different colored lights, different patterns of pulses of lights, etc., that could be emitted by signal devices 111 and detected by a data collector 110 of another vehicle 102.

Other examples of signals 112 include use of signals 112 to communicate a status of a vehicle 101. For example, signals 112 could be used to indicate that a vehicle 101 is in an emergency condition, e.g., needs priority for right-of-way, and/or that a vehicle 101 occupant is disabled or has a medical condition. Alternatively or additionally, signals 112 could be used to indicate that a vehicle 101 lacks a human occupant. Furthermore signals 112 could be used to indicate that the only human occupant of the vehicle 101 is someone not competent to control the vehicle 101 or make decisions relating to control of the vehicle 101, e.g., a child, infirm or impaired person, etc.

In addition, the computer 105 may be configured for communicating with the network 120 to send and/or receive messages containing information such as described above with respect to signals 112 relating to autonomous operation of the vehicle 101 including the computer 105 as well as other vehicles 102. As described below, the network 120 may include various wired and/or wireless networking technologies, e.g., cellular, Bluetooth, wired and/or wireless packet networks, etc. Further, the computer 105, e.g., in the module 106, generally includes instructions for receiving data, e.g., from one or more data collectors 110 and/or a human machine interface (HMI), such as an interactive voice response (IVR) system, a graphical user interface (GUI) including a touchscreen or the like, etc.

As mentioned above, generally included in instructions stored in and executed by the computer 105 is an autonomous driving module 106. Using data received in the computer 105, e.g., from data collectors 110, data included as stored parameters 116, the server 125, etc., the module 106 may control various vehicle 101 components and/or operations without a driver to operate the vehicle 101. For example, the module 106 may be used to regulate vehicle 101 speed, acceleration, deceleration, steering, etc.

Data collectors 110 may include a variety of devices for collecting signals 112 from other vehicles 102, as well as for collecting other data. For example, various controllers in a vehicle may operate as data collectors 110 to provide collected data 115 via the CAN bus, e.g., data 115 relating to vehicle speed, acceleration, etc. Further, sensors or the like, global positioning system (GPS) equipment, etc., could be included in a vehicle and configured as data collectors 110 to provide data directly to the computer 105, e.g., via a wired or wireless connection. Data collectors 110 could also include sensors or the like for detecting conditions outside the vehicle 101, e.g., medium-range and long-range sensors. For example, sensor data collectors 110 could include mechanisms such as RADAR, LADAR, sonar, cameras or other image capture devices, that could be deployed to measure a distance between the vehicle 101 and other vehicles or objects, to detect other vehicles or objects, and/or to detect road conditions, such as curves, potholes, dips, bumps, changes in grade, etc.

A memory of the computer 105 generally stores collected data 115. As mentioned above, in addition to data from signals 112, collected data 115 may include a variety of data collected in a vehicle 101 from data collectors 110. Examples of collected data 115 are provided above, and moreover, as also noted above, data 115 may additionally include data calculated therefrom in the computer 105.

In general, collected data 115 may include any data that may be gathered by a collection device 110 and/or computed from such data. Accordingly, collected data 115 could include a variety of data related to vehicle 101 operations and/or performance, as well as data related to in particular relating to motion of the vehicle 101. In addition, collected data 115 could include a variety of data related to operations and/or performance of other vehicles 102. For example, collected data 115 could include data 115 concerning a vehicle 101 or 102 speed, acceleration, braking, lane changes and or lane usage (e.g., on particular roads and/or types of roads such as interstate highways), average distances from other vehicles at respective speeds or ranges of speeds, and/or other data 115 relating to a vehicle 101 or 102 operation.

A memory of the computer 105 may further store one or more parameters 116 for determining whether a vehicle 102 is partially or fully autonomous. Accordingly, parameters 116 may include a variety of data, such as values for comparison to collected data 110 relating to operation of other vehicles 102. Moreover, as described further below, once a determination of whether a vehicle 102 is partially or fully autonomous is made, the module 106 may execute instructions based on such determination. For example, where a vehicle 102 is determined to be fully autonomous, the module 106 could include instructions for the vehicle 101 to follow the vehicle 102 at such a distance to provide an aerodynamic drafting effect.

As explained above, in some cases, the vehicle 101 and/or other vehicles 102 may communicate a status, e.g., in full autonomous mode, in partial autonomous mode, etc., via one or more signals 112 received by a data collector 110 in a vehicle 101. In these cases, the computer 105 may execute instructions to interpret the signals 112. However, in other cases, collected data 115 in the computer 105 of the vehicle 101 may include sensed data relating to one or more other vehicles 102, such as a speed, lane change pattern, acceleration, deceleration, turning, etc., of another vehicle 102. Parameters 116 can be compared to collected data 115 to provide a determination of whether the other vehicle 102 is in an autonomous mode, and possibly also, if the vehicle 102 is determined to be in autonomous mode, whether the autonomous mode is full, partial, etc. A few examples of using parameters 116 and collected data 115, from the many examples possible, are provided in the following paragraphs.

In one example, collected data 115 could measure a distance that a first vehicle 102 maintained from a second vehicle 102. Moreover, the collected data 115 could include measurements of the distance over time, i.e., could provide an indication of a constancy with which the first vehicle maintained a distance from the second vehicle. A first parameter 116 could specify a distance threshold between two vehicles 102, and a second parameter 116 could specify a time period, e.g., in seconds, for which the distance, plus or minus some deviation, is maintained. The computer 105 could include instructions for comparing the parameters 116 to the collected data 115, and for determining that the first vehicle 102 is in a full or partial autonomous mode if the measured distance between the first and second vehicles 102 is below the threshold indicated by the first parameter for a period of time equal to or greater than that indicated by the second parameter.

In another example, a parameter 116 could specify a speed given a type of road, a known speed limit for the road, road conditions, etc. Collected data 115 could then indicate a speed for a vehicle 102, with collected data 115 for comparison to other parameters 116, e.g., road type, speed limit, road conditions, etc., also being provided. In this example, where a vehicle 102 was determined to the above, or alternatively or additionally, below, a speed threshold specified by a parameter 116, the vehicle 102 could be determined to not be an autonomous vehicle, i.e., the computer 105 might not be able to confirm that a vehicle 102 was autonomous, but could determine that the vehicle 102 was not autonomous vehicle based on comparison of vehicle 102 speeds to one or more predetermined thresholds.

In yet another example, a parameter 116 could specify a range of speeds for a vehicle 102 for a given type of road, a known speed limit for the road, road conditions, weather conditions, etc. Collected data 115 could then indicate, e.g., for a specified period of time, a range of speeds of the vehicle 102. Comparing the range of speeds to the range of speeds specified by the parameter 116, possibly along with other collected data 115 and parameters 116 as mentioned above, the computer 105 could determine whether the vehicle 102 was in an autonomous mode. For example, a vehicle 102 maintaining a relatively constant speed may be determined to be autonomously operated, at least partially with respect to speed control of the vehicle 102.

Alternatively or additionally, a driving profile of a vehicle 102 could be monitored to for comparison of attributes or characteristic of the vehicle 102 to a signature profile of an autonomous vehicle, e.g., a set of parameters 116 for an ideal or model vehicle 101. For example, autonomous vehicles generally may maintain an approximately constant speed unless the autonomous vehicle encounters a road condition, obstacle, etc., that warrants a speed change, such as another vehicle, a changing speed limit, etc. If required to slow down, an autonomous vehicle may also present a distinct and predictable deceleration profile that will look different than that of a non-autonomous vehicle. Accordingly, speed and/or changes of speed of a vehicle 102 are examples of characteristics that may be compared to parameters 116 to determine whether a vehicle 102 is an autonomous vehicle.

Returning to FIG. 1, the network 120 represents one or more mechanisms by which a vehicle computer 105 may communicate with a remote server 125 and/or a user device 150. Accordingly, the network 120 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services.

The server 125 may be one or more computer servers, each generally including at least one processor and at least one memory, the memory storing instructions executable by the processor, including instructions for carrying out various steps and processes described herein. The server 125 may include or be communicatively coupled to a data store 130 for storing collected data 115 and/or parameters 116. For example, one or more parameters 116 for a particular user could be stored in the server 125 and retrieved by the computer 105 when the user was in a particular vehicle 101. Likewise, the server 125 could, as mentioned above, provide data to the computer 105 for use in determining parameters 116, e.g., data concerning weather conditions, road conditions, construction zones, etc.

A user device 150 may be any one of a variety of computing devices including a processor and a memory, as well as communication capabilities. For example, the user device 150 may be a portable computer, tablet computer, a smart phone, etc. that includes capabilities for wireless communications using IEEE 802.11, Bluetooth, and/or cellular communications protocols. Further, the user device 150 may use such communication capabilities to communicate via the network 120 including with a vehicle computer 105. A user device 150 could communicate with a vehicle 101 computer 105 via other mechanisms, such as a network in the vehicle 101, through known protocols such as Bluetooth, etc. Accordingly, a user device 150 may be used to carry out certain operations herein ascribed to a data collector 110, e.g., voice recognition functions, cameras, global positioning system (GPS) functions, etc., in a user device 150 could be used to provide data 115 to the computer 105. Further, a user device 150 could be used to provide a human machine interface (HMI) to the computer 105.

Exemplary Process Flows

Figure 2:
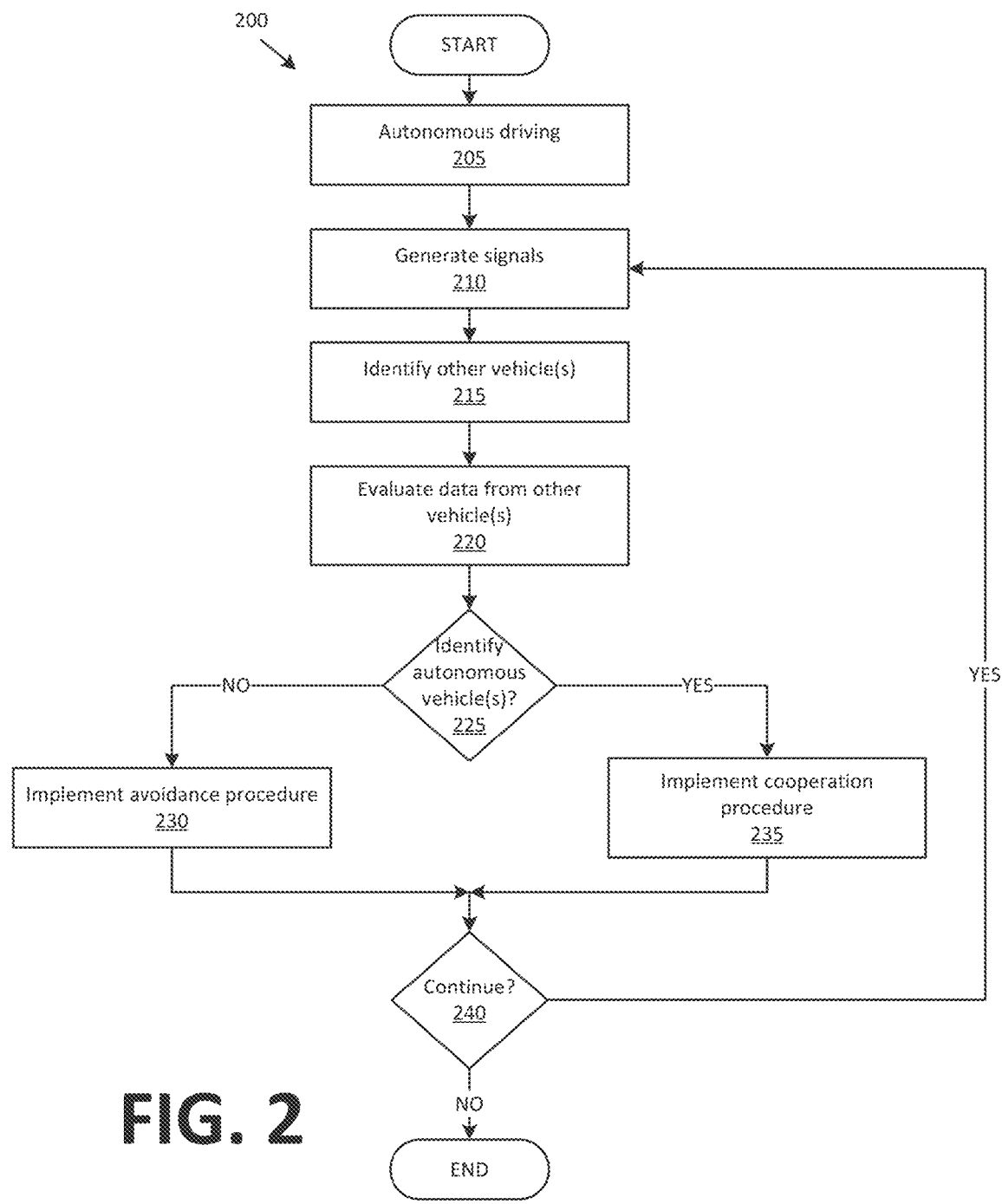
FIG. 2 is a diagram of an exemplary process for a computer in an autonomous vehicle to make determinations concerning other vehicles.

FIG. 2 is a diagram of an exemplary process 200 for a computer 105 in an autonomous vehicle 105 to make determinations concerning other vehicles.

The process 200 begins in a block 205, in which the vehicle 101 commences autonomous driving operations using the parameters 116 retrieved as described above, and also below with respect to the block 215. Thus, the vehicle 101 is operated partially or completely autonomously, i.e., a manner partially or completely controlled by the autonomous driving module 106. For example, all vehicle 101 operations, e.g., steering, braking, speed, etc., could be controlled by the module 106 in the computer 105. It is also possible that the vehicle 101 may be operated in a partially autonomous (i.e., partially manual, fashion, where some operations, e.g., braking, could be manually controlled by a driver, while other operations, e.g., including steering, could be controlled by the computer 105. Likewise, the module 106 could control when a vehicle 101 changes lanes. Further, it is possible that the process 200 could be commenced at some point after vehicle 101 driving operations begin, e.g., when manually initiated by a vehicle occupant through a user interface of the computer 105.

Next, in a block 210, the computer 105 causes signal devices 111 to generate signals 112. For example, signal devices 111 including visible lights could be switched on and off according to one or more predetermined patterns relating to time, colors, etc., e.g., a steady blinking white light to indicate a full autonomous mode, a more rapidly blinking white light to indicate a partial autonomous mode, etc. Moreover, as noted above, signals 112 could include a variety of patterns, colors, etc. to convey a variety of information, e.g., an emergency condition exists with respect to a vehicle 101, a vehicle 101 is in full or partial autonomous mode, a vehicle 101 is being operated manually, etc.

Next, in a block 215, the computer 105 uses collected data 115, including possibly signals 112 from one or more other vehicles 102, to identify vehicles 102 having a proximity to the vehicle 101. The proximity may be predefined, e.g., within a predetermined radius of the vehicle 101, a distance ahead or behind the vehicle 101 on a road, etc. A signal 112 could include information relating to a location of a vehicle 102, e.g., the vehicle 102 could broadcast global positioning system (GPS) coordinates or the like in a signal 112 comprised of one or more data packets. Alternatively or additionally, collected data 115, e.g., radar, sonar, LIDAR, etc., could be used to determine a speed, distance, etc. of another vehicle 102. Yet further additionally or alternatively, a vehicle 102 may be determined to be proximate to a vehicle 101 if the vehicle 101 can receive a signal 112, e.g., can detect a visible light, radio wave, etc., from the vehicle 102.

Next, in a block 220, the computer 105 evaluates collected data 115, including possibly signals 112, from the one or more other vehicles 102 identified in the block 215. For example, as explained above, the computer 105 may compare collected data 115 to one or more parameters 116 to determine whether one or more other vehicles 102 are fully and/or partially autonomously operated or if there are other road users such as pedestrians.

Next, in a block 225, the computer 105 uses the evaluation from the block 220 to determine whether one or more road users and/or autonomous vehicles 102 are within the predetermined proximity to the vehicle 101 described with respect to the block 215. If no other road users or autonomous vehicles 102 are identified, then the process 200 proceeds to a block 230. However, if autonomous vehicles 102 are identified, the process 200 proceeds to a block 235. Further, it should be noted that the block 225 could be executed for each road user and other vehicle 102 identified in the block 215, and that procedures as described with respect to the blocks 230, 235 below, could be executed with respect to each road user and vehicle 102.

In the block 230, the module 106 implements procedures appropriate for sharing a road with, e.g., avoiding, a non-autonomous vehicle 102 and other road users. For example, the module 106 could include instructions for maintaining a predetermined distance from a non-autonomous vehicle 102, and other road users such as pedestrians where the predetermined distance could vary according to road conditions, speed limits, weather conditions, etc. If manually driven vehicles 102 are known to be in an area, the presence of such vehicle 102 could be a parameter 116 input to the module 106 affecting a manner in which the autonomous vehicle 101 is operated. For example, it may be beneficial to start signaling a lane change earlier, leave a larger gap for a lane change, etc. Additionally for example, if a computer 105 in a vehicle 101 detects that a non-autonomous first vehicle 102 is starting a lane change into its lane, the autonomous vehicle 101 could purposefully increase the gap between it and a second vehicle 102 in front of the vehicle 102 to allow the first non-autonomous vehicle 102 to more comfortably in to the gap, and more safely change lanes. This behavior of the vehicle 101 may be balanced by collected data 110 concerning what the vehicles behind the autonomous vehicle 101 are doing, e.g., distance behind, speed and/or closing speed to the vehicle 101, etc. If, for example, there is a non-autonomous vehicle 102 closely following, i.e., "tailgating," the autonomous vehicle, applying the brakes on the autonomous vehicle 101 may be dangerous and/or undesirable.

In the block 235, the module 106 implements procedures appropriate for sharing a road with, e.g., cooperating with, and autonomous vehicle 102. For example, as mentioned above, a vehicle 101 may "convoy" or draft behind, another autonomous vehicle 102. Alternatively or additionally for example, the module 106 may include instructions for maintaining a predetermined distance from an autonomous vehicle 102 that is less than a predetermined distance that the module 106 is programmed to maintain from a non-autonomous vehicle 102. Yet further additionally or alternatively, for example, if an autonomous vehicle 101 is initiating a lane change into a lane occupied by another autonomous vehicle 102, the vehicles 101,102 could work cooperatively to best merge the vehicles 101, 102 into the same lane. For example, computers 105 on each vehicle 101, 102, could communicate with one another, e.g., via the network 120 or some other mechanism, speeds of the two vehicles 101, 102 could be autonomously matched, and the vehicle 101 could then merge into the other lane with a smaller gap and a smaller disruption to existing traffic flow.

Following either the block 230 or the block 235, the computer 105 determines in a block 240 whether the process 200 should continue. For example, the process 200 may end if autonomous driving operations end and a driver resumes manual control, if the vehicle 101 is powered off, etc. In any case, if the process 200 should not continue, the process 200 ends following the block 240. Otherwise, the process 200 returns to the block 210.

CONCLUSION

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising a first vehicle computer comprising a processor and a memory, wherein the computer is configured to:
   collect first data from two or more first vehicle data collectors to measure one or more of a second vehicle's speed acceleration, braking, turning and distance from other vehicles, wherein the first vehicle data collectors include one or more of a radar, a lidar, sonar, and an image capture device;
   use the first collected data to determine whether the second vehicle is being operated fully autonomously and, if not fully autonomously, partially autonomously;
   determine to autonomously operate the first vehicle based at least in part on determining that the second vehicle is being operated at least partially autonomously;
   collect second data from the first vehicle sensors relating to the second vehicle; and
   autonomously operate the first vehicle based at least in part on the second collected data by controlling at least first vehicle speed and steering.

2. The system of claim 1, wherein the first collected data further includes a signal that includes at least one of visible light and a radio wave from the second vehicle.

3. The system of claim 1, wherein the second vehicle is being operated fully autonomously.

4. The system of claim 1, wherein the computer is further configured to compare the first collected data relating to the second vehicle to a stored parameter to determine that the second vehicle is being operated at least partially autonomously.

5. The system of claim 1, wherein the computer is further configured to use the first collected data to determine that the second vehicle is being operated under an emergency status.

6. The system of claim 1, wherein the computer is further configured to use the first collected data to determine that the second vehicle is being operated manually.

7. The system of claim 1, wherein autonomously operating the first vehicle includes maintaining a predetermined distance from the second vehicle.

8. The system of claim 1, wherein the computer is further configured to collect third data relating to at least one road user in addition to the second vehicle, the at least one road user in addition to the second vehicle including at least one of a third vehicle and a pedestrian.

9. The system of claim 8, wherein the computer is further configured to:
   use the third collected data relating to at least one road user in addition to the second vehicle to determine that the third vehicle is being operated at least partially autonomously; and
   take an action to autonomously operate the first vehicle based at least in part on determining that the third vehicle is being operated at least partially autonomously.

10. A method, comprising:
   collecting first data from two or more first vehicle data collectors to measure one or more of a second vehicle's speed acceleration, braking, turning and distance from other vehicles, wherein the first vehicle data collectors include one or more of a radar, a lidar, sonar, and an image capture device;
   using the first collected data to determine whether the second vehicle is being operated fully autonomously and, if not fully autonomously, partially autonomously;

determining to autonomously operate the first vehicle based at least in part on determining that the second vehicle is being operated at least partially autonomously;

collecting second data from the first vehicle sensors relating to the second vehicle; and autonomously operating the first vehicle based at least in part on the second collected data by controlling at least first vehicle speed and steering.

11. The method of claim 10, wherein the first collected data further includes a signal that includes at least one of visible light and a radio wave from the second vehicle.

12. The method of claim 10, wherein the second vehicle is being operated fully autonomously.

13. The method of claim 10, further comprising comparing the first collected data relating to the second vehicle to a stored parameter to determine that the second vehicle is being operated at least partially autonomously.

14. The method of claim 10, further comprising using the first collected data to determine that the second vehicle is being operated under an emergency status.

15. The method of claim 10, further comprising using the first collected data to determine that the second vehicle is being operated manually.

16. The method of claim 10, wherein autonomously operating the first vehicle includes maintaining a predetermined distance from the second vehicle.

17. The method of claim 10, further comprising collecting third data relating to at least one road user in addition to the second vehicle, the at least one road user in addition to the second vehicle including at least one of a third vehicle and a pedestrian.

18. The method of claim 17, further comprising
using the third collected data relating to at least one road user in addition to the second vehicle to determine that the third vehicle is being operated at least partially autonomously; and taking an action to autonomously operate the first vehicle based at least in part on determining that the third vehicle is being operated at least partially autonomously.

19. A computer-readable medium having tangibly embodied thereon instructions executable by a computer processor, the instructions including instructions to:

collect first data from two or more first vehicle data collectors to measure one or more of a second vehicle's speed acceleration, braking, turning and distance from other vehicles, wherein the first vehicle data collectors include one or more of a radar, a lidar, sonar, and an image capture device;

use the first collected data to determine whether the second vehicle is being operated fully autonomously and, if not fully autonomously, partially autonomously;

determine to autonomously operate the first vehicle based at least in part on determining that the second vehicle is being operated at least partially autonomously;

collect second data from the first vehicle sensors relating to the second vehicle; and autonomously operate the first vehicle based at least in part on the second collected data by controlling at least first vehicle speed and steering.

20. The medium of claim 19, the instructions further including instructions to:

collect third data relating to at least one road user in addition to the second vehicle, the at least one road user in addition to the second vehicle including at least one of a third vehicle and a pedestrian;

use the third collected data relating to at least one road user in addition to the second vehicle to determine that the third vehicle is being operated at least partially autonomously; and take an action to autonomously operate the first vehicle based at least in part on determining that the third vehicle is being operated at least partially autonomously.

* * * * *